Aug. 30, 1938.  W. P. STUCK  2,128,623

VALVE

Filed July 27, 1937

WILLIAM P. STUCK
INVENTOR

BY Victor J. Evans & Co.
ATTORNEYS

Patented Aug. 30, 1938

2,128,623

UNITED STATES PATENT OFFICE 2,128,623

VALVE

William P. Stuck, Mount Ayr, Iowa

Application July 27, 1937, Serial No. 156,018

1 Claim. (Cl. 277—42)

My invention relates to valves and more particularly to that class associated with inner tubes.

One of the principal objects of my invention is to provide an inner tube valve equipped with means for preventing the accumulation of dirt and foreign matter therein from interfering with the proper functioning of the parts.

Another principal object of my invention is to provide a valve of the above described character equipped with internally operated means for preventing the escape of air from the tube.

A further object of my invention is to provide means whereby the parts may be readily disassembled and replacements made, thus eliminating the necessity of replacing the entire inner valve structure as heretofore has been the practice.

A still further object of my invention is to provide means whereby the various associated parts are protected in a manner to prevent accidental displacement and deformity thereof.

Other objects and advantages will be apparent from the following description, appended claim and annexed drawing.

Referring to the drawing wherein like reference characters designate like parts throughout the several views.

Figure 1:
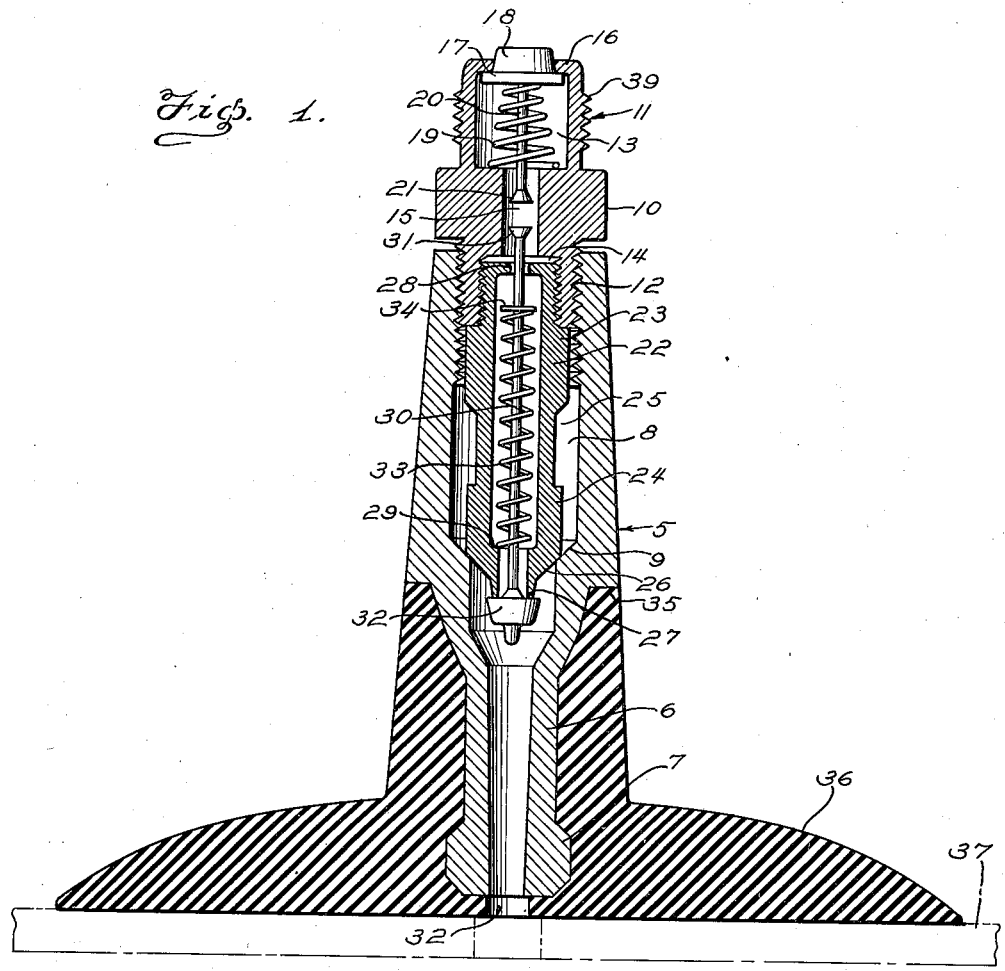
Fig. 1 is a sectional view of my invention.

The valve comprising my invention, in the preferred embodiment illustrated in Fig. 1, consists of a body portion 5 formed on one end with a reduced shank 6 terminating in a head section 7. The body is provided with a longitudinally extending bore 8 threaded at the upper end thereof and formed with an intermediate reduced section and a restricted lower section, said intermediate section providing a seat 9.

An upper member 10 is fashioned with upper and lower sections 11 and 12, respectively, each formed with chambers 13 and 14, respectively, and connected together by a reduced passage 15. The outer end of the upper section 11 is flanged inwardly as at 16 and provides a shoulder for engagement with a collar 17 formed on the lower face of a plug 18. The plug 18 is adapted to normally seal the chamber 13 by the action of a coil spring 19 interposed between said plug and the lower inner face of said chamber. A stem 20 is mounted on the lower face of the plug and extends into the passage 15 and is fashioned with a head 21 for engagement with a head formed on an adjacent valve stem hereinafter described.

The lower section 12 is exteriorly threaded for engagement with the threaded upper section of the bore 8. The chamber 14 is threaded and has attached thereto the threaded upper section of a barrel 22.

Exteriorly, the barrel 22 is formed with upper and lower enlarged sections 23 and 24, respectively, and an intermediate reduced section 25. The lower section 24 is provided with an inclined surface 26 for engagement with the seat 9 and terminates in a cap-seat 27. The longitudinally extending bore of said barrel is reduced at the upper end thereof as at 28 to form a restricted aperture and the lower end thereof is reduced to form a spring engaging shoulder 29. Mounted within said bore and having an end extending into the passage 15 is a valve stem 30 having a head 31 formed on the upper end thereof for engagement with the head 21 carried by the stem 20. A rubber cap 32 is secured to the lower end of the valve stem and normally engages with the cap-seat 27 by means of a coil spring 33 interposed between the shoulder 29 and a collar 34 secured on the stem 30.

The body 5 is shouldered as at 35 and the shank and head portions therebelow are adapted to be positioned within a similar shaped opening formed in a rubber gusset 36 vulcanized or otherwise suitably secured to an inner tube 37, illustrated in dotted lines in Fig. 1. Said opening is provided with a lower reduced passage 38 communicating with the interior of the inner tube and bore 8.

The outer periphery of the section 11 is threaded as at 39 for a purpose hereinafter referred to.

It will be apparent, that the introduction of air from a suitable air nozzle of ordinary type presented against the upper surface of the plug 18 will force the same downwardly and permit air to enter the chamber 13. The downward movement of the plug 18 effects engagement of the stem 20 carried thereby with the stem 30 causing a like movement to be imparted to the stem 30, thereby unseating the cap 32 from the cap-seat 27. This positioning of the parts permits of a free flow of air through the communicating passages into the inner tube. When sufficient air has been introduced into the inner tube to inflate the same to a desired pressure, the air nozzle is removed from the member 10, thereby, permitting the parts to assume the normal closed position illustrated in Fig. 1.

Obviously, the positioning of the various parts and arrangement relative to each other permits ready removal and replacement. Furthermore, it is to be noted that the normal positioning of the heads 21 and 31 relative to each other permits of accidental displacement of the plug 18 downwardly without unseating the valve cap 32, thus, preventing any leakage of air from within the inner tube.

The particular arrangement in construction of the corelated parts eliminates the necessity of using a valve cap as heretofore practiced. The threads 39, formed on the member 10, are for the purpose of securing thereto a guard for use only in extreme cases where it is desirable to operate a motor vehicle over submarginal land, muddy roads or the like.

Figure 2:
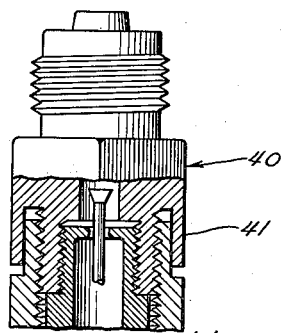
Fig. 2 is a detail view of a modified form thereof.

In the modification illustrated in Fig. 2, the cap 40 has formed thereon a projecting collar 41 for protecting the threaded section from dirt and other foreign matter.

It is to be distinctly understood that various changes and modifications may be resorted to in the construction and arrangement of parts without departing from the spirit of the invention or scope of the appended claim.

Having described my invention, what I claim is:

A device of the character described, comprising, a body adapted to be secured to an inner tube and formed with a longitudinally extending bore having a threaded upper section and a restricted lower section, an upper member threaded in said upper section and formed with upper and lower chambers having a communicating passage, a plug operable within said upper chamber, means normally positioning said plug in a manner to close said chamber, a barrel secured within said lower chamber and formed with a cap-seat at the lower end thereof, a cap engaging said seat and provided with a stem extending through said barrel and into said passage, means within said barrel for normally maintaining said cap in engagement with said seat, and a stem carried by said plug and extending into said passage for operating said first mentioned stem and normally arranged in spaced relation from said first mentioned stem whereby to prevent the accidental displacement of said plug from actuating said first mentioned stem and permitting normal operation of said plug to actuate said first mentioned stem to disengage said cap from said cap-seat.

WILLIAM P. STUCK.